US009829979B2

United States Patent
Brombach et al.

(10) Patent No.: US 9,829,979 B2
(45) Date of Patent: Nov. 28, 2017

(54) AUTOMOTIVE TOUCHSCREEN CONTROLS WITH SIMULATED TEXTURE FOR HAPTIC FEEDBACK

(71) Applicant: FORD GLOBAL TECHNOLOGIES, LLC, Dearborn, MI (US)

(72) Inventors: Ronald P. Brombach, Plymouth, MI (US); Laura V. Hazebrouck, Birmingham, MI (US); John R. Van Wiemeersch, Novi, MI (US); Ryan E. Hanson, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 754 days.

(21) Appl. No.: 14/263,053

(22) Filed: Apr. 28, 2014

(65) Prior Publication Data

US 2015/0309573 A1 Oct. 29, 2015

(51) Int. Cl.
 *G06F 3/048* (2013.01)
 *G06F 3/01* (2006.01)
 (Continued)

(52) U.S. Cl.
 CPC .............. *G06F 3/016* (2013.01); *B60K 37/02* (2013.01); *G06F 3/0412* (2013.01); *G06F 3/0482* (2013.01); *G06F 3/04817* (2013.01); *G06F 3/04842* (2013.01); *G06F 3/04847* (2013.01); *G06F 3/04883* (2013.01)

(58) Field of Classification Search
 None
 See application file for complete search history.

(56) References Cited

U.S. PATENT DOCUMENTS 6,897,390 B2 5/2005 Caldwell et al.
7,466,843 B2 12/2008 Pryor
(Continued)

OTHER PUBLICATIONS

Bau, O. et al., Tesla Touch: Electrovibration for Touch Surfaces. Proceedings of the 23rd Annual ACM Symposium on User interface Software and Technology, Oct. 3-6, 2010, New York. pp. 283-292.
(Continued)

*Primary Examiner* — William Trapanese
(74) *Attorney, Agent, or Firm* — Frank A. MacKenzie; MacMillan, Sobanski & Todd, LLC

(57) ABSTRACT

A vehicle control system uses a touchscreen display to displaying a graphical HMI and detect a contact point where touched by a user's finger. A haptic texture system has an electrode disposed across the touchscreen display and a signal generator generating an oscillating signal to produce a potential difference between the finger and the electrode resulting in a corresponding perceived texture as the finger slides over the touchscreen. A control circuit is configured to set at least a frequency or amplitude of the oscillating signal to vary the perceived texture according to first and second modes while navigating the graphical HMI. The first mode uses a localized texture mapping defined by respective feature icon selection regions on the touchscreen display. The second mode uses a status texture mapping relating the perceived texture to each potential adjustment setting available for a feature icon that has been selected using the first mode.

15 Claims, 5 Drawing Sheets

(51) Int. Cl.
*G06F 3/041* (2006.01)
*G06F 3/0481* (2013.01)
*G06F 3/0482* (2013.01)
*G06F 3/0484* (2013.01)
*G06F 3/0488* (2013.01)
*B60K 37/02* (2006.01)

(56) References Cited

U.S. PATENT DOCUMENTS

| | | | |
|---|---|---|---|
| 7,489,303 B1 | 2/2009 | Pryor | |
| 7,834,857 B2 | 11/2010 | Prados | |
| 7,871,945 B2 | 1/2011 | Berger et al. | |
| 8,269,726 B2 | 9/2012 | Prados | |
| 8,593,420 B1* | 11/2013 | Buuck | G06F 3/041 |
| | | | 345/173 |
| 2005/0030292 A1 | 2/2005 | Diederiks | |
| 2005/0285846 A1 | 12/2005 | Funaki | |
| 2008/0024459 A1* | 1/2008 | Poupyrev | G06F 3/016 |
| | | | 345/173 |
| 2008/0068349 A1* | 3/2008 | Rosenberg | A63F 13/06 |
| | | | 345/173 |
| 2008/0211779 A1* | 9/2008 | Pryor | G01C 21/3664 |
| | | | 345/173 |
| 2010/0259503 A1* | 10/2010 | Yanase | G06F 3/0416 |
| | | | 345/174 |
| 2010/0315345 A1 | 12/2010 | Laitinen | |
| 2012/0313770 A1 | 12/2012 | Zeiger et al. | |
| 2012/0327006 A1* | 12/2012 | Israr | G06F 3/044 |
| | | | 345/173 |
| 2015/0175172 A1* | 6/2015 | Truong | B60W 50/10 |
| | | | 701/36 |

OTHER PUBLICATIONS

Bau, O. et al., Revel: Tactile Feedback Technology for Augmented Reality, ACM Transactions on Graphics, vol. 31, No. 4, Article 89, Publication Date: Jul. 2012.

* cited by examiner

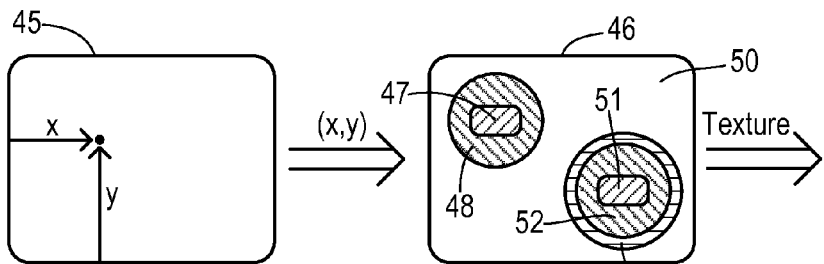
Fig. 4
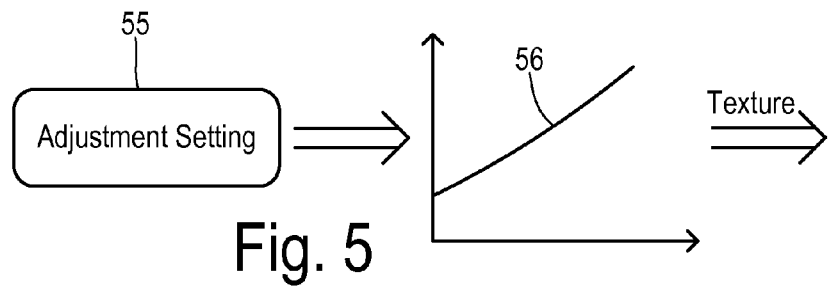
Fig. 5
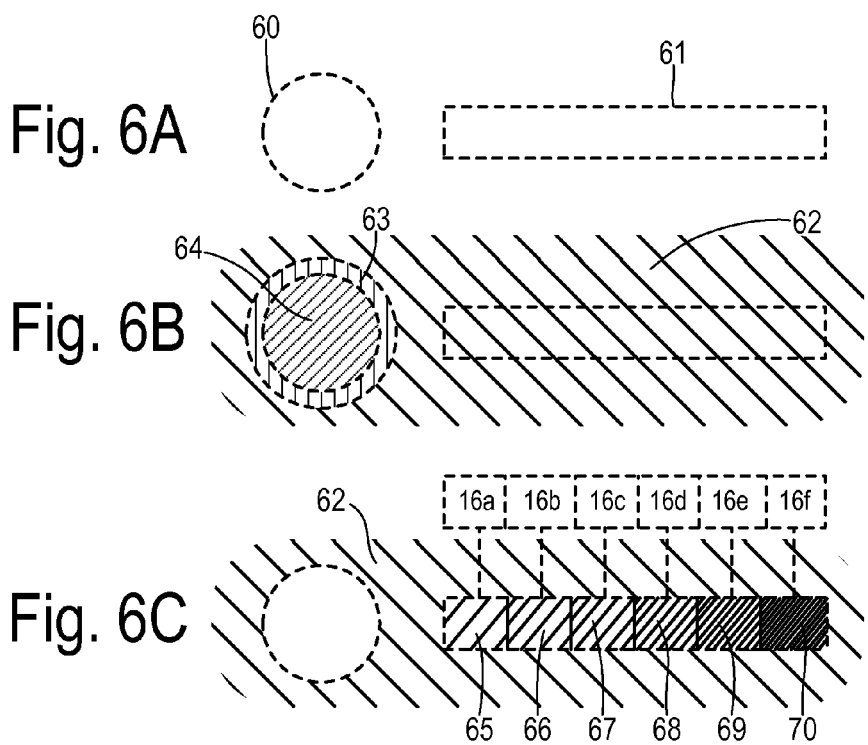
Fig. 6A
Fig. 6B
Fig. 6C
Fig. 6D

US 9,829,979 B2

AUTOMOTIVE TOUCHSCREEN CONTROLS WITH SIMULATED TEXTURE FOR HAPTIC FEEDBACK

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to driver operator controls in a mobile vehicle such as a car, truck, train, bus, or airplane, and, more specifically, to touchscreen control panels with haptic feedback.

A typical transportation vehicle such as a car or truck includes many operator-controlled systems and accessories. In order to handle the diverse interactions with vehicle electronic systems such as a climate control system, media and entertainment system, driver information system, navigation system, or wireless communication system, a centralized control panel interface may be provided on the vehicle dashboard or instrument panel. Such a centralized unit can result in ease of use and lowering overall manufacturing costs. One common type of human-machine interface involves the use of a touchscreen for displaying different context-sensitive menus with various graphical elements associated with the controlled features or systems for manipulation by the user's fingers in order to adjust various parameters of the associated electronically-controlled systems.

The ease of use and the amount of time required for making appropriate selections are important considerations for vehicle design in order to limit the potential driver distraction associated with use of the controls. It is desired to avoid driver distraction that might result when using a touchscreen by having to visually search for a desired feature or zone on the touchscreen and then having to wait for a confirmation that a desired control action has been executed in response to a user's touch command. Furthermore, road-induced vibration and rocking motions of the user's body can affect the ability to accurately place or slide a finger on a touchscreen in the intended locations. Further, sun load on the screen may hamper the driver's ability to see the screen function icons clearly.

Voice commands and synthesized speech responses are sometimes used in an attempt to avoid these issues, but it can be difficult to accurately detect and characterize speech in a noisy vehicle environment and often the driver may not know or recognize the proper key words that must preface certain audible commands.

Automotive touchscreen controls are known which provide haptic feedback by mechanically moving (e.g., vibrating) the surface of the touchscreen in association with activation of a particular command (see, e.g., U.S. Pat. No. 7,834,857 and U.S. Pat. No. 8,269,726). Haptic vibration requires a motor, solenoid, or piezoelectric device to produce mechanical vibration of the touchscreen, thereby imposing significant limitations upon the touchscreen technologies and materials that can be used. Such systems are also subject to mechanical wear and failures, and they produce undesirable noise when activated.

A new type of haptic feedback for touchscreens has become available based upon the principle of electrovibration to create tactile sensations based on electrostatic friction between a touchscreen surface and a user's finger (without any actual vibration of the touchscreen). For example, a system known as Tesla-Touch has been described (see., e.g., U.S. patent application publication 2012/0327006) employing a transparent electrode disposed over the touchscreen for interacting with a moving finger that slides over the transparent electrode, wherein a periodic electrical signal is applied between the electrode and finger to induce an attractive force by an electric field that is modulated to vary the friction in a desired manner such that when the finger is moved across the screen surface in the presence of the modulation, and resulting variable friction, the friction pattern will simulate the feeling of different textures. For example, a sinusoidal modulation may feel like a wavy surface and a square wave modulation may feel like parallel lines or ridges. Although not described in connection with context-sensitive menus or other automotive control panels, changing the texture of a tactile feedback while dragging an adjustment slider has been suggested for use in graphical user interfaces (GUIs). However, no system has yet been shown or suggested for using varying textures in navigating context-sensitive menus which would be very helpful for navigating automotive controls with reduced need for visual attention.

SUMMARY OF THE INVENTION

The present invention uses friction to simulate different textures on a touchscreen in automotive applications. In one embodiment, various feature icons can appear to be raised by having an increased (perceived) sliding friction in order to allow easier positioning of the finger over the desired icon. The driver can obtain additional haptic feedback on "slider" type controls by changing the friction efforts relative to the position on the slider (e.g., changing friction associated with changing audio volume, cabin temperature, or fan speed). Moreover, the haptic feedback can change the user's feel of the friction in order to indicate when a desired on/off feature setting has been selected.

An appropriate signal must be injected into the user and/or display, with the signal injector and tactile object (i.e., user's body) sharing a common ground. This is achieved in an automotive environment by the use of one or more paths which are balanced/calibrated to provide for a consistent feel (i.e., signal strength). Since the user may have different layers of insulation (pants thickness, coats, gloves, or other clothing) that may affect the system effectiveness at achieving the desired signal level, the signal amplitude may require adjustment in order to obtain a consistent perception of the textures. Preferred locations for establishing a ground path of a user in an automotive environment, include placing electrodes or plates in or at the surface of a seat (e.g., seat bottom or seat back), in a seat belt, on a steering wheel, on a door arm rest, on the floor pan, on the accelerator pedal, on the surface of a transmission shifter, or as a bar or ledge along the bottom of the touchscreen where the user could rest a thumb, finger, or palm.

In one aspect of the invention, a vehicle control system comprises a touchscreen display for displaying a graphical HMI and detecting a contact point on the display established manually when touched by a finger of a user. A haptic texture system has an electrode disposed across the touchscreen display and a signal generator generating an oscillating signal to produce a potential difference between the finger and the electrode resulting in a corresponding perceived texture as the finger slides over the touchscreen display. A control circuit is configured to set at least a frequency or amplitude of the oscillating signal to vary the perceived texture according to first and second modes while navigating the graphical HMI. The first mode uses a localized texture mapping defined by respective feature icon selection regions on the touchscreen display. The second mode uses a status texture mapping relating the perceived texture to each potential adjustment setting available for a feature icon that has been selected using the first mode. The contents of the touchscreen display may be the same or may change when switching from the first mode to the second mode. For example, when a feature icon is selected for adjusting the audio volume, a slider icon for the volume control could be enlarged (i.e., screen zooming) to facilitate the desired actions.

BRIEF DESCRIPTION OF THE DRAWINGS

FIG. 4 depicts a texture mapping according to a first mode of the invention.

FIG. 5 depicts a texture mapping according to a second mode of the invention.

FIGS. 6A-6D show varying textures associated with feature icons and adjustment icons.

DETAILED DESCRIPTION OF PREFERRED EMBODIMENTS

Figure 1:
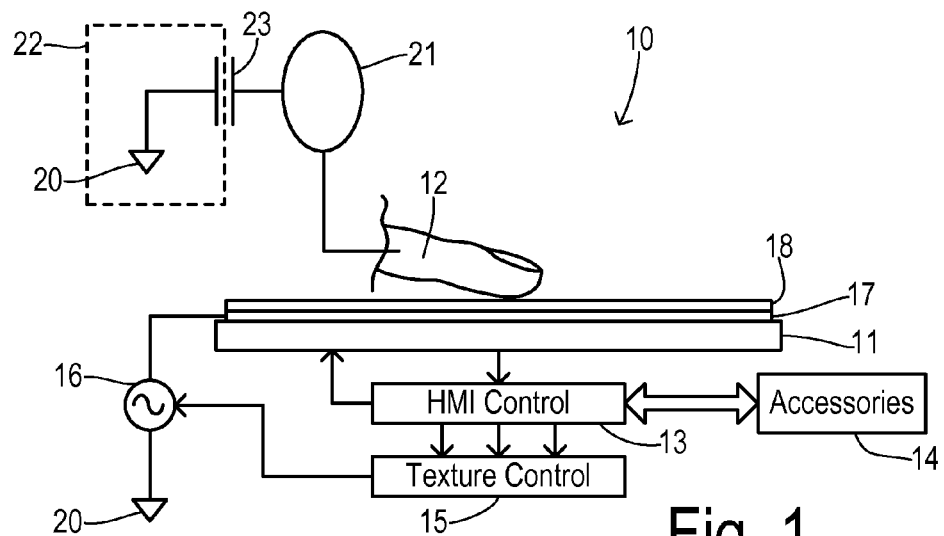
FIG. 1 is a schematic representation of a vehicle control system according to one preferred embodiment.

Referring to FIG. 1, a vehicle control system 10 includes a touchscreen display 11 as known in the art for displaying a graphical HMI and for detecting a contact point of a user's finger 12 on touchscreen display 11, whereby a user can navigate the HMI by manually touching display 11 according to the displayed feature icons on display 11 as described below. An HMI control circuit 13 may include a display driver for providing the graphical elements and feature icons or other symbols onto display 11 and receives sensed signals for detecting the position of a contact point with finger 12. HMI control circuit 13 is coupled to various systems and accessories 14 to provide electronic control including various settings and adjustments according to a context-sensitive menu structure within the graphical HMI.

The invention includes a haptic texture system including a texture control circuit 15 coupled with a signal generator 16 that generates an oscillating signal which is provided to an electrode 17 disposed over the front surface of touchscreen display 11. An optional insulator layer 18 may be disposed over electrode 17 for insulating electrode 17 from finger 12.

Signal generator 16 is referenced to an electrical ground 20 within the vehicle. User finger 12 is coupled via the user's body 21 to vehicle ground 20 via a user grounding path 22. Grounding path 22 may preferably include a capacitive interface 23 created at a convenient contact point with the user as described in greater detail below.

As a result of the arrangement in FIG. 1, an oscillating signal from signal generator 16 produces a potential difference between finger 12 and electrode 17 resulting in a corresponding perceived texture as finger 12 slides over touchscreen display 11. Texture control circuit 15 is configured to set at least a frequency or amplitude of the oscillating signal to vary the perceived texture as the user navigates the graphical HMI.

HMI control circuit 13 is generally of a known type which is provided with the necessary extensions described herein for interacting with texture control circuit 15 to share information including a current contact point(s) where finger 12 is being detected and context-sensitive information including the current value or state of adjustment settings applicable to a feature icon that may be active (i.e., selected) in the menu currently visible on touchscreen display 11.

The present invention varies the perceived texture according to first and second modes while navigating the graphical HMI. The first mode relates to selection of feature icons which are the desired target for adjustment. The second mode relates to making the actual adjustment of the chosen feature.

Figure 2:
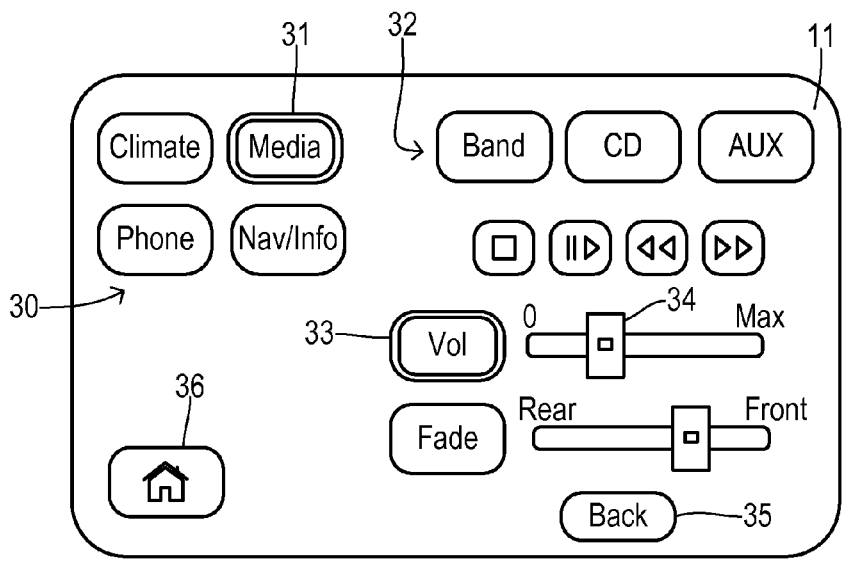
FIG. 2 shows one screen of a graphical HMI displayed by a touchscreen.
Figure 3:
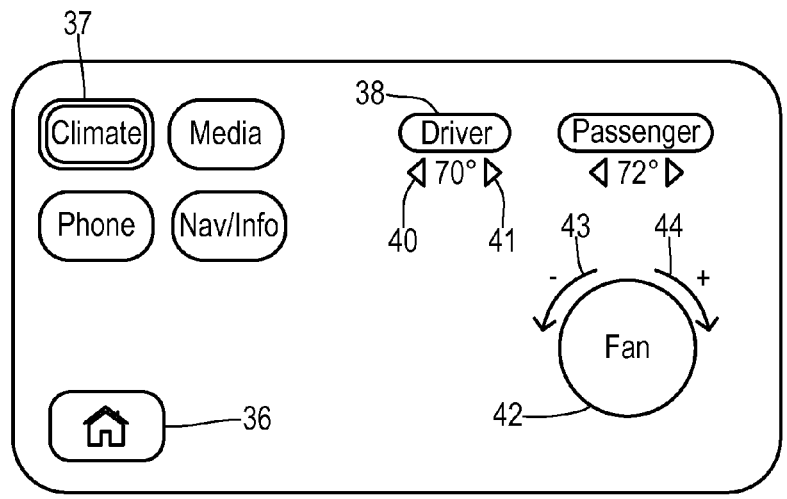
FIG. 3 shows another screen of the graphical HMI displayed on the touchscreen for adjusting a different set of vehicle features.

FIGS. 2 and 3 show example graphical menu screens for which textures in the first and second modes may be generated as disclosed herein to potentially reduce the level of the diversion of the user's attention in performing an adjustment task.

FIG. 2 shows a first example of a menu screen on display 11 including a plurality of feature icons 30 for selecting sub-menus corresponding to different subsystems. Common subsystems may include a climate control, media/entertainment system, wireless communication such as cellular phone, and a vehicle navigation/information system. A media-selection feature icon 31 is shown with a visual highlight as a result of having been manually selected. In a media-control sub-menu, a context-sensitive portion of the screen displays an interface for controlling the entertainment system using corresponding feature icons 32 to select an audio source such as radio band, CD, or auxiliary sources. Additional feature icons may include transport control buttons, volume button 33, and a speaker fade button. Feature icon 33 for controlling volume is shown as being highlighted after having been selected by the user, wherein that selection was assisted using texture mapping according to the first mode of the invention.

In the first mode for applying haptic textures for providing feedback to a finger sliding over display 11, the texture is varied according to the spatial position of the contact point of a finger on screen 11. The texture is controlled based on a mapping that identifies distinct textures for contact points that coincide with feature icons such as icons/symbols 30, 32, and 33. After selection of a particular feature icon, it may be then highlighted on display 11 (as shown for volume feature icon 33). The actual selection of an icon is handled by touchscreen display 11, and may from tapping the icon or resting the finger on the desired feature icon for a predetermined time. Since these acts do not involve sliding of the finger, feedback to the user would not be provided using texture. Once a particular feature icon is selected using the first mode, texture can again be employed in the second mode to supply haptic feedback in association with adjustment movements or gestures of the finger involving sliding.

Instead of the localized texture mapping defined according to the respective feature icon selection regions as used in the first mode, the second mode uses a status texture mapping that relates the perceived texture at any particular time to the state or intensity of the feature adjustment setting in effect at that time for the feature controlled by the feature icon that is currently selected. For example, a slider 34 is associated with volume feature icon 33 wherein the user's finger may drag slider icon 34 left or right to change the magnitude of the audio volume. As the volume intensity is adjusted, the status texture mapping causes an intensity of the perceived texture to change correspondingly. In the case of a slider adjustment like that of slider 34 wherein a one-to-one correspondence exists between the dragged position and the resulting magnitude of the controlled variable, the perceived texture intensity corresponds simultaneously to both the actual adjustment setting and the localized position of the finger contact point.

Once the user has completed their desired adjustment of the setting for the selected feature icon in the second mode, the texture control circuit needs to revert to the first mode in order to facilitate the selection of the next feature icon by the user. The change back to the first mode can be triggered by a predetermined event such as 1) the user lifting their finger up from the slider icon on touchscreen, 2) expiration of a predetermined elapsed time, or 3) finger tapping on a command icon such as a back button 35 or a home button 36.

FIG. 3 illustrates a second menu screen corresponding to activation of a climate control feature icon 37. This example shows an embodiment of the second mode wherein the intensity of the perceived texture is related to the state or magnitude of the current adjustment setting (i.e., is not related or only partially related to the physical location of the contact point). For example, after a driver temperature feature icon 38 has been selected using the first mode, the texture control circuit operates in the second mode while the user manipulates a temperature decrease icon 40 or a temperature increase icon 41. The intensity of the perceived texture can be made proportional to the magnitude of the driver temperature setting, which can be changed by sliding the finger over icons 40 and 41, respectively. When the temperature command setting increases, the "intensity" of the texture correspondingly increases, thereby providing haptic feedback to the user proportional to the temperature setting. Similarly, a fan speed feature icon 42 can be selected in the first mode (i.e., the texture having a localized intensity coincident with icon 42). Once selected, the localized texture for icon 42 is discontinued (i.e., the first mode ends) and a texture mapping is utilized coincident with adjustment arrows 43 and 44 wherein the user can obtain adjustment of the fan speed by sliding their finger in the indicated directions over icons 43 and 44 (i.e., second mode begins). As each gesture causes a change in the current adjustment setting for the fan speed, the intensity of the perceived texture that is coincident with icons 43 and 44 is proportionally changed.

One example of a localized texture mapping used for the first mode is illustrated in FIG. 4. A screen contact point detection map 45 shows the translation of a detected contact point by the touchscreen display into x and y coordinates for the contact point. In response to providing the contact point (x,y) as an input to a localized texture mapping 46, respective intensity values are obtained as an output for controlling the oscillator signal to produce the corresponding perceived texture. Each possible menu or submenu screen has a respective, context-sensitive mapping. For example, a first region 47 coincides with the location of a particular feature icon on one particular menu screen being displayed. A surrounding intermediate texture region 48 may be provided between region 47 and a background region 50 in order to create a perceived ramping of the texture as the finger nears the intended target, in order to assist in guiding the finger more easily to the intended feature icon target region 47. Background region 50 may preferably correspond to a lack of added texture so that the greatest signal to noise ratio can be provided between region 47 and background region 50. Another target region 51 corresponds to a different feature icon in the corresponding menu. A ramping up from the background texture 50 may include multiple steps, including intermediate regions 52 and 53 that surround region 51.

FIG. 5 shows a status texture mapping for relating perceived texture to each of the potential adjustment settings available in the adjustment task for a respective feature icon. For example, the HMI control circuit or the actual subsystems being controlled provide a current adjustment setting 55 to the texture control circuit. The texture control uses setting 55 as an input to a map relating setting 55 to a particular texture. The mapping can be comprised of a plot 56 or a mathematical relationship or equation.

To further illustrate the changing texture mappings, FIGS. 6A-6C show variable texture regions coincident with a feature icon 60 and a slider adjustment region 61 according to one embodiment. FIGS. 6A-6C may correspond to a menu structure of the type shown in FIG. 2, for example FIG. 6A shows the graphical elements of the HMI displayed by the touchscreen display. In FIG. 6B, the first mode generates a background texture region 62 (e.g., with zero texture) surrounding an intermediate texture region 63 and a high texture region 64. As the user's finger slides over the display, it is guided by the texture differences in order to more easily find the spot coinciding with feature icon 60. Once feature icon 60 is selected (e.g., by tapping or resting of the finger), the second mode for controlling the texture is activated as shown in FIG. 6C. The background texture 62 coincides with feature icon 60 and the regions surrounding slider icon 61. Within slider icon 61, a plurality of sub-regions 65-70 are produced with proportionally increasing texture intensities corresponding to the increases in the adjusted values for the targeted feature.

As shown in FIG. 6D, a particular feature icon 71 may have only two possible states or adjustment settings such as turning a feature on and off. In the second mode, distinct textures 72 or 73 may be activated in accordance with the on or off setting of the feature.

Figure 7A:
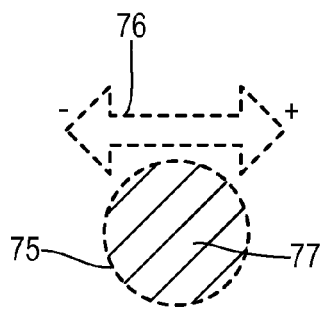
FIGS. 7A-7C show varying textures for an alternative embodiment.
Figure 7B:
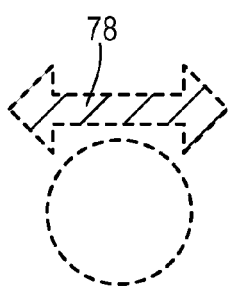
Figure 7C:
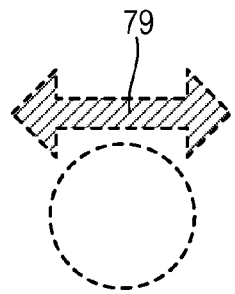

FIGS. 7A-7C illustrate various texture mappings in the first and second modes when using adjustment gestures as shown by the menu example from FIG. 3, for example. A feature icon 70 occupies a certain position on the touchscreen menu which is adjacent to an adjustment icon 76 defining a sliding location for making feature adjustment settings. FIG. 7A illustrates a texture 77 activated in the first mode allowing the position of feature icon 75 to be more easily located and selected. In the second mode, no texture would be created coincident with feature icon 75 but would instead be created in association with the location of adjustment icon 76 and having an intensity determined in response to the controlled variable. Thus, in FIG. 7B the adjustment setting may have a relatively low intensity reflected by a correspondingly low intensity of a texture 78. When the adjustment setting has a higher intensity (e.g., as the user slides or repeatedly swipes their finger in the positive direction on adjustment icon 76), then a correspondingly higher intensity texture 79 is applied as shown in FIG. 7C.

Figure 8A:
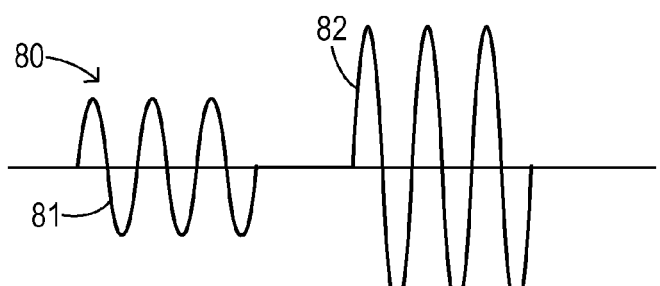
FIGS. 8A-8D show oscillating signals for creating various textures and intensities.
Figure 8B:
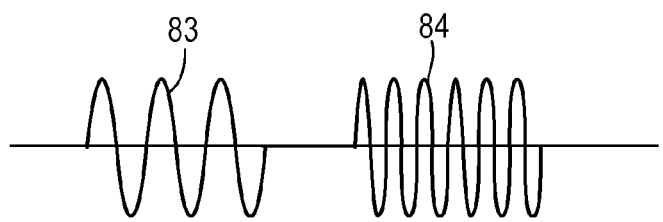

As used herein, the intensity of the texture means any different perception of texture that can be recognized by the user. These distinct perceptions can be obtained in various ways such as shown in FIGS. 8A-8D. FIG. 8A shows an oscillating signal 80 wherein a first perceived texture is obtained with a periodic signal 81 characterized by a first frequency and a first amplitude. To create a distinct texture that can be perceived as a higher intensity, another oscillating signal 82 can be employed having the same frequency and a greater amplitude. Alternatively, the frequency of the oscillating signal can be varied as shown in FIG. 8B. Thus, a first texture is obtained with an oscillating signal 83 having a first frequency and a first amplitude. A distinct or higher intensity texture is obtained using an oscillating signal 84 having the same amplitude and a higher frequency.

Figure 8C:
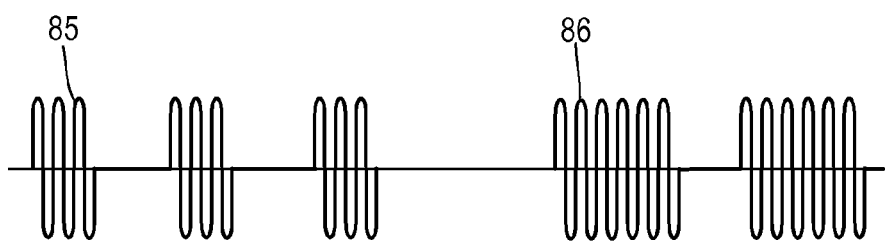

As shown in FIG. 8C, the duty cycle or pattern of the oscillating signal can be varied in order to attain different perceived textures. Thus, a first texture can be obtained using a periodic signal 85 which is modulated (i.e., turned on and off) corresponding to a first duty cycle. A contrasting texture is obtained with an oscillating signal 86 with a different duty cycle having longer on-periods than oscillating signal 85.

Figure 8D:
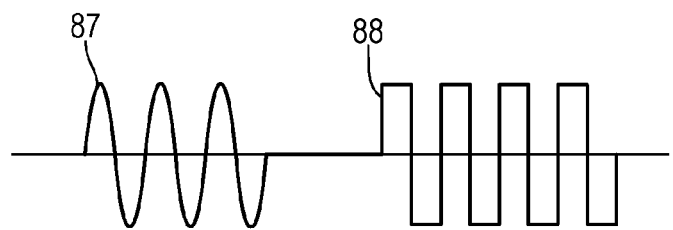

As shown in FIG. 8D, the intensity of the perceived texture can alternatively be obtained by varying the wave shape of the oscillating signal. For example, an oscillating signal 87 can be utilized having a sinusoidal shape for a first texture, and a contrasting texture with a feel of a sharper edge can be obtained with an oscillating signal 88 formed as a square wave. Using the foregoing variety of oscillator signals, various textures including perceived changes in height, waviness, or edge sharpness can be obtained.

Figure 9:
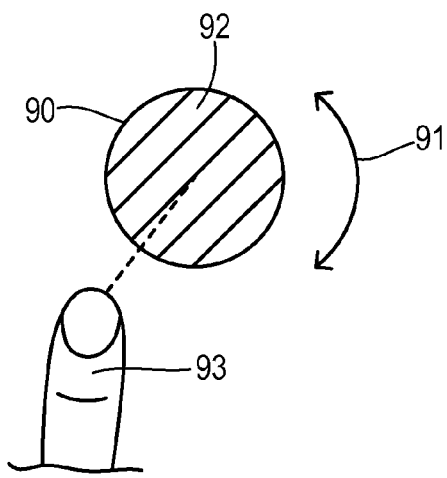
FIGS. 9-11 are plan views showing a two-finger approach for selecting a feature and adjusting a feature setting.
Figure 10:
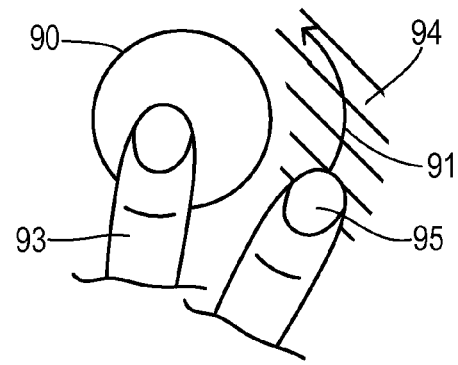
Figure 11:
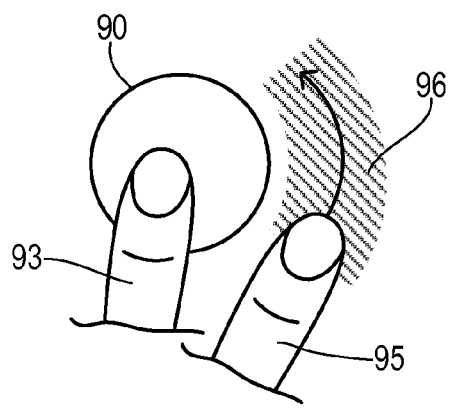

One particularly advantageous gesture system involving the variable textures of the invention is shown in FIGS. 9-11. These gestures can involve the use of two of the user's fingers, such as an index finger and the adjacent middle finger. Thus, a feature icon 90 has an associated adjustment icon 91. In the first mode shown in FIG. 9, the user's finger 93 slides over the display and is guided by a distinct texture 92 mapped to feature icon 90 by the localized texture mapping. Once finger 93 rests on icon 90, then the second mode is activated as shown in FIG. 10 wherein a texture 94 is generated over adjustment icon 91 using the status texture mapping and the then current adjustment value of the target feature. As long as finger 93 remains engaged with icon 90, the texture is defined by the second mode. A second finger 95 can then interact with adjustment icon 91 while a texture 94 is generated according to the status texture mapping in FIG. 10. As finger 95 slides over adjustment icon 91 in a direction resulting in an increase in the feature adjustment setting, the intensity of the texture increases (as shown by an increased intensity texture 96 in FIG. 11). This arrangement is very advantageous since the user can quickly locate the first finger on the desired feature icon and then the second finger will be automatically located in the appropriate region for performing adjustments using the second mode of texture variation. Therefore, a desired fine tuning of the adjustment can be obtained by the user without requiring the user to continue looking at the touchscreen display. When the first finger is no longer engaged with icon 90, then the texture control circuit may switch back to the first mode automatically so that the next feature icon can be selected by the user.

The signal generator 16, full screen electrode 17, and display as shown in FIG. 1 will result in the same texture applied to the entire screen. This may be fine for HMI button or control strategies that use one finger since the location of the finger can be detected by the touch screen and the texture signal can be modified as required to match the movements of the finger as detected by the touch screen. However, for strategies that require two fingers such as those shown in FIGS. 10 and 11, or to account for situations where the user may use two fingers to slide across a slider making it difficult to know the location of the finger, it would be desirable for the system comprised of display 11 and layers 17 and 18 to have the ability to create localized patterns in which different signals can be directed to just these localized areas of the screen in order to achieve some of the unique patterns described above. This can be done in a few ways.

For a friction strategy that uses different textures in certain zones, such as the HMI methods proposed in FIGS. 6B through 7C, it may be preferred to create multiple signal generators that connect to segmented shapes on an alternate version of layer 17 designated here as 17' (not shown). Layer 17' could be a circuit board with copper traces representing the patterns required for a slide bar or a rotary knob and then each of the pieces of these patterns would be controlled by a separate signal generator source with the appropriate signal frequency and amplitude required to create the desired textures. For example, to generate the slide bar of FIG. 6C, the six segments 65 through 70 would be driven by respective signal generators 16a, 16b, 16c, 16d, 16e, and 16f. Alternatively, to create the rotary function shown in FIGS. 10 and 11, there could be two zones driven by signal generators 16a and 16b. Having two signal sources would protect for the situation where the finger being used as the pivot point may drift as the customer performs to rotation action. If their finger does drift, it would feel the same texture as the swiping finger and they would likely be confused. However, this can be addressed by creating two different signal frequencies and/or amplitudes for different zones.

Figure 12:
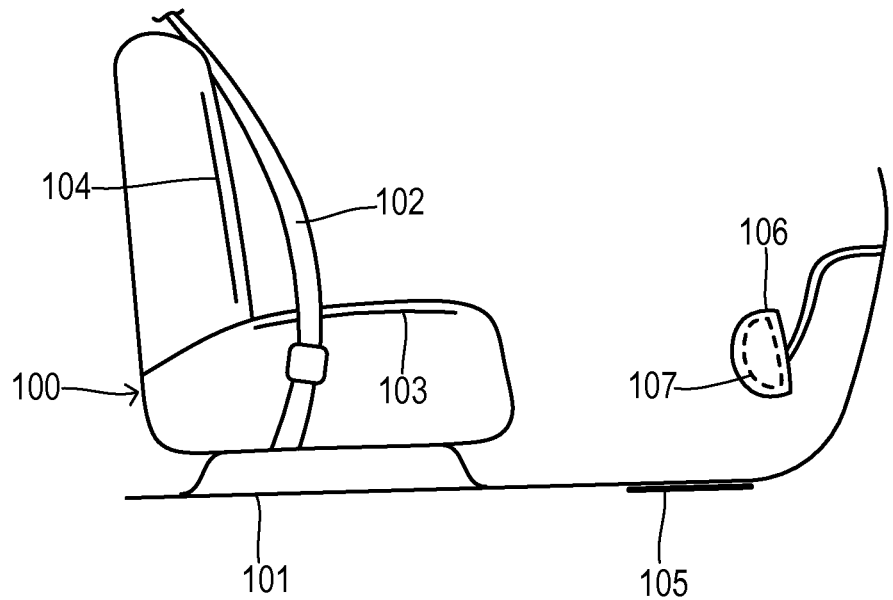
FIG. 12 is a diagram showing alternative placements for a user grounding path.

Layer 17' would be located behind the display 11. With layer 17' behind the display it would not impact viewing of the graphics generated by the HMI controller 13. However, due to the greater distance between the surface 18 and the electrode 17', it may be necessary to increase the magnitude of the signal from generator 16 in order to maintain the desired signal strength at the display surface 18. In order to ensure sufficient signal strength across the interface between the user's finger and the touchscreen electrode, a sufficiently consistent grounding path needs to be provided to the user. This can be achieved in the automotive environment by one or multiple concurrent grounding paths that capacitively couple the user to a vehicle's common ground. Several non-limiting examples for user grounding paths are shown in FIG. 12. A user's seat 100 is supported on a vehicle floor 101. A seatbelt 102 may be strapped over the user while seated. To provide an integrated conductive element, seatbelt 102 may be fabricated with an outer insulative flexible material such as polyester over a conductive layer made of a polymeric material loaded with conductive filler particles. Alternatively, seatbelt 102 may include a webbing layer made from conductive fibers (as disclosed in U.S. Pat. No. 7,871,945 or U.S. Pat. No. 7,886,617). An end of the conductive element within seatbelt 102 is connected to ground via the vehicle body or frame (not shown). In addition to or alternatively, a conductive element made from conductive fibers or a conducting sheet of various kinds can be incorporated in a seating surface such as conductive element 103 in a seat bottom surface or conductive element 104 in a seat back surface. The conductive elements in seatbelt 102 or seat surfaces 103 and 104 interface with the user's torso in order to create effective capacitive paths to ground. The conductive element can also be provided by a steel floor 101 or a separate footplate 105 in order to capacitively couple through the user's feet. Likewise, a brake or accelerator pedal 106 can include a conductive element 107 capacitively coupling with the user's foot. Although not shown in FIG. 12, a grounding path could also be provided via the steering wheel or a gear shift selector handle for the driver, of the door arm rest.

Figure 13:
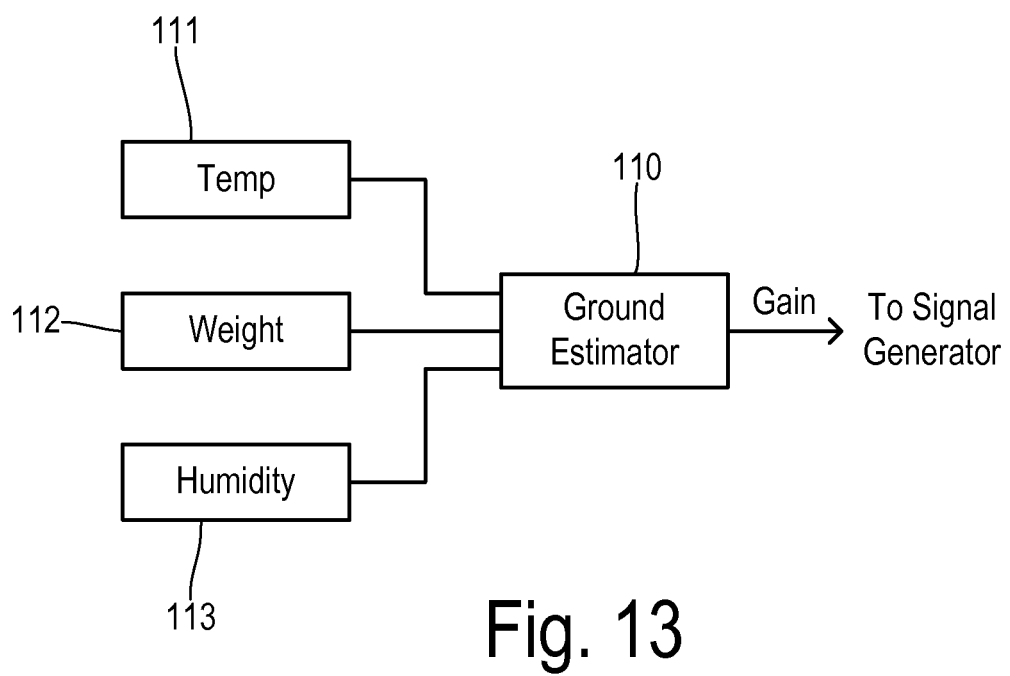
FIG. 13 is a block diagram showing derivation of a gain for compensating for variations in the coupling of the user to a ground reference.

Due to various changing conditions, the impedance associated with the capacitive coupling of the user to the common ground via the conductive element incorporated in the seatbelt, seat surface or other vehicle structures, the effectiveness of creating the perceived texture variations can be affected. To handle the changing conditions, the signal generator can employ a constant current source that automatically compensates for variations in the grounding impedance. Alternatively, the gain utilized in the signal generator when generating the oscillating signal can be adjusted based on other estimates or characterizations of the grounding impedance. As shown in FIG. 13, a ground estimator 10 may receive inputs from a temperature sensor 111, a weight sensor 112, and a humidity sensor 113 which measure various operating conditions which may influence the effectiveness of the grounding path. For example, in cold weather the user may be wearing extra clothing which reduces the effective capacitance obtained via conductive elements in the seatbelt and seat. Consequently, when a low ambient temperature is detected, ground estimator 110 increases a gain command provided to the signal generator for boosting the oscillating signal so that the desired texture perception is obtained. A weight signal from weight sensor 112 can provide a measure of body size which may also influence the effective capacitance. Humidity sensor 113 provides a humidity measurement which can reflect the environmental dielectric properties which can also influence the ground coupling, so that the gain can be appropriately compensated.

What is claimed is:

1. A vehicle control system for a plurality of vehicle accessories, comprising:
    a touchscreen display for displaying a graphical HMI and detecting a contact point on the display established manually by touching by a finger of a user, wherein the graphical HMI defines feature icon selection regions and a separate submenu portion, wherein each feature icon selection region corresponds to a respective vehicle accessory, and wherein the submenu portion represents adjustment icons in a submenu selectably displayed corresponding to adjustable parameters of a selected one of the feature icon selection regions;
    a haptic texture system having an electrode disposed across the touchscreen display and a signal generator generating an oscillating signal to produce a potential difference between the finger and the electrode resulting in a corresponding perceived texture as the finger slides over the touchscreen display; and
    a control circuit that is configured to set at least a frequency or amplitude of the oscillating signal to vary the perceived texture according to first and second modes while navigating the graphical HMI, wherein the first mode uses a localized texture mapping defined according to the feature icon selection regions on the touchscreen display, wherein the localized texture mapping in the first mode varies the perceived texture according to proximity of the contact point to each feature icon selection region, wherein the second mode uses a status texture mapping relating intensity of the perceived texture to an adjusted intensity of each potential adjustment setting available in the selected submenu;
    wherein the second mode changes the status texture mapping in response to the selected feature icon selection region while the localized texture mapping of the first mode is unchanged.

2. The system of claim 1 wherein the status texture mapping is localized to an adjustment slider image in the graphical HMI.

3. The system of claim 1 wherein the potential adjustment settings are comprised of a respective on setting and a respective off setting for the selected feature icon selection region, and wherein the status texture mapping relates two distinct textures to the on and off settings.

4. The system of claim 1 wherein the localized texture mapping in the first mode provides no texture at respective positions between respective feature icon selection regions and a maximum texture coincident with the respective feature icon selection regions.

5. The system of claim 1 wherein the control circuit varies the oscillating signal to provide a ramping texture approaching each feature icon selection region.

6. The system of claim 1 wherein the touchscreen display detects contact points for first and second fingers, wherein the control circuit switches from the first mode to the second mode after the first finger becomes engaged with a selected feature icon selection region, remains in the second mode responsive to the second finger while the first finger remains engaged with the selected feature icon selection region, and then switches back to the first mode when the first finger is no longer engaged with the selected feature icon selection region.

7. The system of claim 1 wherein the control circuit switches from the first mode to the second mode in response to a manual selection of a selected feature icon selection region and remains in the second mode until a predetermined event.

8. The system of claim 7 wherein the predetermined event is comprised of a manual selection of a corresponding adjustment icon in the graphical HMI.

9. The system of claim 7 wherein the predetermined event is comprised of a predetermined elapsed time.

10. The system of claim 1 further comprising a user grounding path to provide a common ground for the user and the signal generator, wherein the user grounding path is capacitively coupled to the user.

11. The system of claim 10 wherein the user grounding path is comprised of a conductive element incorporated in a seat belt.

12. The system of claim 10 wherein the user grounding path is comprised of a conductive element incorporated in a seat surface.

13. The system of claim 10 further comprising:
    a ground coupling estimator measuring a vehicle state correlated with an expected capacitive coupling between the user and the user grounding path;
    wherein the signal generator includes a gain control that is adjusted in response to the measured vehicle state.

14. The system of claim 1 wherein the electrode has a plurality of zones coupled to a plurality of signal generators.

15. The system of claim 1 wherein a selected feature icon is highlighted while the submenu portion displays the adjustment settings corresponding to the selected feature icon.

* * * * *